(12) United States Patent
Seymour

(10) Patent No.: US 11,601,040 B2
(45) Date of Patent: Mar. 7, 2023

(54) AC TO DC POWER SUPPLY SYSTEMS AND METHODS

(71) Applicant: AquaHydrex, Inc., Louisville, CO (US)

(72) Inventor: Eric Seymour, Fort Collins, CO (US)

(73) Assignee: AquaHydrex, Inc., Louisville, CO (US)

( * ) Notice: Subject to any disclaimer, the term of this patent is extended or adjusted under 35 U.S.C. 154(b) by 139 days.

(21) Appl. No.: 17/127,076

(22) Filed: Dec. 18, 2020

(65) Prior Publication Data

US 2021/0111635 A1 Apr. 15, 2021

Related U.S. Application Data

(63) Continuation of application No. 16/466,914, filed as application No. PCT/AU2017/051380 on Dec. 13, 2017, now abandoned.

(Continued)

(51) Int. Cl.
 H02M 1/14 (2006.01)
 H02M 1/42 (2007.01)
 (Continued)

(52) U.S. Cl.
 CPC ............... *H02M 1/14* (2013.01); *H02M 1/12* (2013.01); *H02M 1/42* (2013.01); *H02M 5/458* (2013.01);
 (Continued)

(58) Field of Classification Search
 CPC ............ H02M 1/12; H02M 1/14; H02M 1/42; H02M 7/219; H02M 7/23
 See application file for complete search history.

(56) References Cited

U.S. PATENT DOCUMENTS 5,471,125 A 11/1995 Wu
5,499,178 A  3/1996 Mohan
(Continued)

FOREIGN PATENT DOCUMENTS

CN 201904622 U 7/2011
CN 103081335 A * 5/2013 .............. H02M 7/06
(Continued)

OTHER PUBLICATIONS

Lee, Jye-June, "Final Office Action Regarding U.S. Appl. No. 16/466,914", filed Jul. 21, 2020, p. 28, Published in: US.
(Continued)

*Primary Examiner* — Kyle J Moody
*Assistant Examiner* — Jye-June Lee
(74) *Attorney, Agent, or Firm* — Neugeboren O'Dowd PC

(57) ABSTRACT

AC to DC power supplies are disclosed. One AC to DC power supply includes a transformer having a primary side and a secondary side and a passive rectifier coupled to the secondary side of the transformer. The passive rectifier is configured to rectify AC power at the secondary side to DC power at an output of the rectifier. An active rectifier is configured to control voltages applied to the primary side of the transformer to induce a non-sinusoidal voltage at the secondary side of the transformer and a sinusoidal current drawn by the passive rectifier. An isolating DC-to-DC converter is coupled between the active rectifier and the output of the passive rectifier to magnetically couple power from the active rectifier to the output of the passive rectifier while galvanically isolating the active rectifier from the output of the passive rectifier.

16 Claims, 16 Drawing Sheets

Related U.S. Application Data

(60) Provisional application No. 62/433,784, filed on Dec. 14, 2016.

(51) Int. Cl.
*H02M 5/458* (2006.01)
*H02M 7/219* (2006.01)
*H02M 7/23* (2006.01)
*H02M 1/12* (2006.01)
*H02M 1/00* (2006.01)

(52) U.S. Cl.
CPC ............ *H02M 7/219* (2013.01); *H02M 7/23* (2013.01); *H02M 1/007* (2021.05); *Y02B 70/10* (2013.01)

(56) References Cited

U.S. PATENT DOCUMENTS

| | | | |
|---|---|---|---|
| 6,882,550 | B1 | 4/2005 | Baumgart |
| 7,148,661 | B2 | 12/2006 | Trainer et al. |
| 7,892,407 | B2 | 2/2011 | Gibson et al. |
| 9,030,046 | B2 | 5/2015 | Lewis |
| 2005/0146226 | A1* | 7/2005 | Trainer .................. H02M 1/12 307/73 |
| 2006/0114642 | A1 | 6/2006 | Liu et al. |
| 2010/0013530 | A1 | 1/2010 | Kim et al. |
| 2013/0063981 | A1 | 3/2013 | Dujic et al. |
| 2013/0127381 | A1 | 5/2013 | Meiners et al. |
| 2015/0263646 | A1 | 9/2015 | Hara et al. |

FOREIGN PATENT DOCUMENTS

| | | | |
|---|---|---|---|
| CN | 204258410 U | 4/2015 | |
| WO | WO-9418683 A1 * | 8/1994 | ............. H02M 1/12 |

OTHER PUBLICATIONS

Lee, Jye-June, "Office Action Regarding U.S. Appl. No. 16/466,914", filed Oct. 9, 2019, p. 37, published in: US.

O'Dowd, Sean, "Response to Final Office Action Regarding U.S. Appl. No. 16/466,914", filed Sep. 21, 2020, p. 9, Published in: US.

O'Dowd, Sean, "Response to Office Action Regarding U.S. Appl. No. 16/466,914", filed Oct. 9, 2019, p. 37, Published in: US.

Evans, I. C. et al., "High Power Clean DC Bus Generation Using AC-Link AC to DC Power Voltage Conversion, DC Regulation, and Galvanic Isolation", "IEEE Electric Ship Technologies Symposium", 2009, pp. 290-301, Publisher: IEEE.

Pyakurayal, S. et al., "Feedback Controller for a 3-Phase 6-Pulse Rectifier", "The International Journal of Engineering and Science (IJES)", 2013, pp. 23-27, vol. 2, No. 8.

Da Silva, E. R. C. et al., "Fundamentals of Power Electronics", "Power Electronics for Renewable and Distributed Energy Systems", 2013, pp. 7-20, Publisher: Springer-Verlag.

Gamit et al., "Multi Pulse Rectifier Using Different Phase Shifting Transformers and its THD Comparison for Power Quality Issues", "International Research Journal of Engineering and Technology", Jan. 2016, pp. 1025-1033, vol. 03, No. 01.

Ramachandran, Mani, "International Search Report and Written Opinion Regarding International Application No. PCT/AU2017/051380", dated Mar. 8, 2018, p. 13 Published in: AU.

* cited by examiner

INNER LOOP

AC TO DC POWER SUPPLY SYSTEMS AND METHODS

CLAIM OF PRIORITY UNDER 35 U.S.C. § 120

The present Application for Patent is a Continuation of patent application Ser. No. 16/466,914 entitled "DC POWER SUPPLY SYSTEMS AND METHODS" filed Jun. 5, 2019, pending, which is a national stage application of International Application No. PCT/AU2017/051380 entitled "DC POWER SUPPLY SYSTEMS AND METHODS" filed Dec. 13, 2017, which claims priority to Provisional Application No. 62/433,784 entitled "DC POWER SUPPLY SYSTEMS AND METHODS" filed Dec. 14, 2016 all of which are assigned to the assignee hereof and hereby expressly incorporated by reference herein

BACKGROUND

Field

The present disclosed embodiments relate generally to power supplies, and more specifically to DC power supplies.

Background

Power supplies that convert AC power to DC power to meet the demands of a variety of different DC loads are ubiquitous. Silicon controlled rectifiers (SCRs) (also referred to as thyristors), for example, have been widely used to rectify AC power to DC power. While these types of rectifiers work well with continuously-connected loads that have a positive resistive slope, SCR based rectifiers create a large phase displacement between the applied input voltage and drawn line current. This is due to the nature of the thyristor devices themselves in that they cannot typically be deliberately turned-off and they only return to a blocking state when their forward current drops below zero. The lower the desired DC voltage with respect to a designed maximum, the higher the displacement that occurs; thus, these types of rectifiers have a very poor power factor. In addition, these types of rectifiers create high line harmonics that may require line-side filtering to prevent the harmonics from affecting the AC power system and to prevent escape of RF noise that may be created.

To reduce the harmonics that are created during rectification, higher pulse order rectifiers such as 12 and 24 pulse rectifiers exist. These higher pulse-order rectifiers reduce the harmonics and have an improved power factor relative to 6-pulse rectifiers. This class of converters controls, or modulates, DC-side output voltage through a process involving delayed turn-on where "volt-seconds" are removed from the AC waveforms that contribute to the rectified signal. A consequence of this is that higher order bridge configurations for thyristors and SCRs require multiple 6-pulse rectifiers to be placed in series with each fed by an appropriately phased transformer winding. Therefore, the benefit of reduced harmonics provided by higher pulse order designs comes at the cost of multiple voltage drops as rectifier currents pass through multiple devices. These voltage drops substantially reduce the efficiency of the power conversion. This inefficiency is especially problematic in low-voltage applications. A 100 Volt 12-pulse power supply, for example, flows instantaneous current through four devices (with a 1 to 1.5 Volt drop each) in series at any moment, which creates a 4-6% drop in voltage.

Alternatively, DC power supplies incorporating sophisticated active switch-mode technologies, such as insulated-gate bipolar transistors (IGBTS), may be used instead of thyristor-based DC power supplies. This class of DC supply provides very good DC-side regulation, but often still relies on a simple 6-pulse diode rectifier to convert AC to unregulated DC which subsequently feeds the transistor-based DC-to-DC converter. As a result, even in this seemingly more advanced design, line-side harmonics can still be a problem. Depending on the scrutiny placed on the application by the interconnecting electrical utility, which is often a function of region and size of the application, users of this type of DC supply may also be required to install expensive, and often custom, AC-side filters. And the addition of sophisticated controls and filtering to remove harmonics makes these types of system prohibitively expensive for many applications. Moreover, while extremely high load currents of 1000s of amps are commonly served by thyristor-based designs, it is more difficult to design for such high currents using IGBTs as the devices themselves have lower current ratings than the largest thyristors. Thus, there is a need for economically viable, high current, low voltage, high efficiency DC power supplies that provide acceptable power quality.

SUMMARY

According to an aspect, an AC to DC power supply includes a transformer having a primary side and a secondary side and a passive rectifier coupled to the secondary side of the transformer. The passive rectifier is configured to rectify AC power at the secondary side to DC power at an output of the rectifier. An active rectifier is configured to control voltages applied to the primary side of the transformer to induce a non-sinusoidal voltage at the secondary side of the transformer and a sinusoidal current drawn by the passive rectifier. An isolating DC-to-DC converter is coupled between the active rectifier and the output of the passive rectifier to magnetically couple power from the active rectifier to the output of the passive rectifier while galvanically isolating the active rectifier from the output of the passive rectifier.

Another aspect includes an AC to DC power supply system that includes a three-phase transformer including a grid-connectable primary side with three windings and a secondary side. An active rectifier is coupled to the primary side of the transformer, and the active rectifier switchably connects each of the three windings in series between a positive bus and a negative bus to alter a magnetic flux in a core of the transformer. A passive rectifier is coupled to the secondary side of the transformer to rectify AC power to DC power at an output of the passive rectifier, and an isolating DC-to-DC converter is coupled between the positive bus and the negative bus and the output of the rectifier. The DC-to-DC converter is configured to feed power from the active rectifier to the output of the passive rectifier while galvanically isolating the active rectifier from the output of the passive rectifier.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
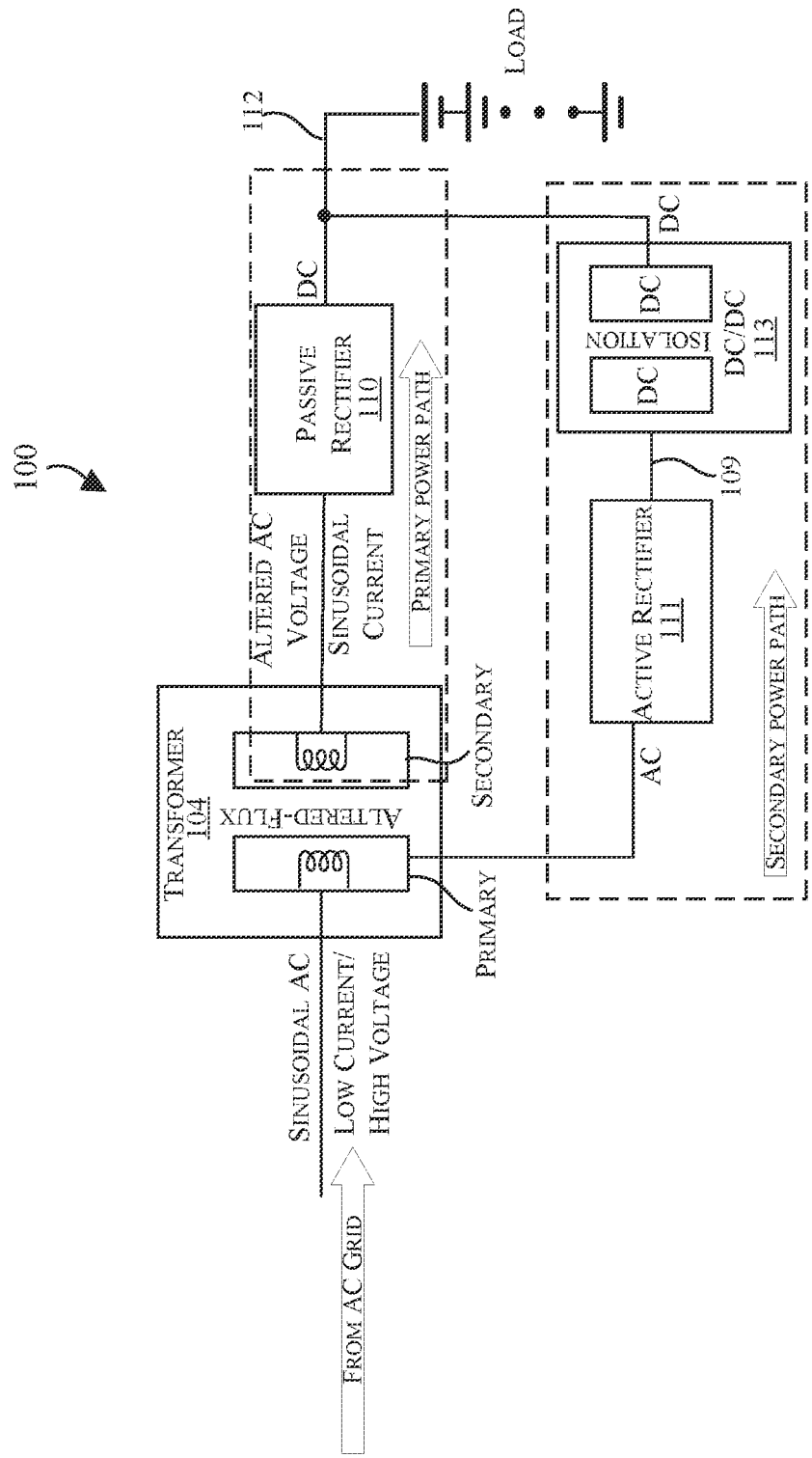
FIG. 1 is a block diagram depicting a DC power supply system.

Referring to FIG. 1, shown is a block diagram depicting a DC power supply system 100. As shown, the DC power supply system 100 includes a transformer 104, a passive rectifier 110, an active rectifier 111, and an isolating DC-to-DC converter 113. Also depicted is a DC load that is coupled to a DC output of the passive rectifier, which is an output 112 of the DC power supply system 100. In general, the DC power supply system 100 functions to convert AC power from an AC grid to DC power provided to the DC load. As used herein, "AC grid" refers simply to a source of AC power without being limited to any specific type or origin of AC power and regardless of the ownership of the underlying transmission components. For example, the AC grid may be a utility-owned grid, or the AC grid may be a feed from a distribution system within the same premises where the DC power supply system resides.

The AC grid power may be sinusoidal AC power provided by a power utility, and the DC load 112 may be a variety of different types of DC loads. The sinusoidal AC voltage may be 120, 220, 230, or 240 Volt single phase voltage or 400, 480, or 600 Volt three-phase voltage for example, but the voltage level may vary and the number of phases of the AC voltage need not be three phases.

In some applications, the DC load 112 may be an electrochemical load that requires a relatively low voltage to operate. U.S. Patent Application Publication Nos. 2015/0292094, 2016/0211528, and Australian provisional patent application No. 2015905160 (filed 14 Dec. 2015) ("Incorporated Applications for Patent"), which are incorporated herein by reference in their entirety, disclose a variety of different types of electrochemical cells that may realize the DC load depicted in FIG. 1. These electrochemical cells may be arranged in a combination of parallel and series configurations to realize the load depicted in FIG. 1. Depending upon the arrangement, type, and number of cells of the DC load, the DC voltage may be between 16 and 120 Volts, and the current may be between about 1000 and 2000 amps. It is certainly contemplated that other types of DC loads may be driven by the power supply system depicted in FIG. 1. The Incorporated Applications for Patent also disclose DC power supply systems, which embodiments described herein improve upon.

According to an aspect, the DC power supply system 100 utilizes high performance, actively switched devices, e.g., IGBTs, on a low-current/high-voltage side of the DC power supply system 100 for regulation of the DC power at the output 112 of the DC power supply system 100 while utilizing a passive rectifier 110 on a high-current/low-voltage side of the DC power supply system 100 to rectify a majority of the power that is applied to the DC load. As shown in FIG. 1, the passive rectifier 110 is disposed in a primary power path that includes a secondary of the transformer and the passive rectifier 110 while the active rectifier 111 is disposed in a secondary power path that includes a primary side of the transformer 104, the active rectifier 111, and the DC-to-DC converter 113. Thus, the depicted DC power supply system 100 combines the cost-effective aspects of the passive rectifier 110 (to convert a majority of the applied power) while utilizing the performance aspects of the active rectifier 111 to regulate the output power. Another aspect of the active rectifier 111, discussed below, is that the active rectifier 111 may operate to improve the power quality of the DC power supply system 100.

In general, the transformer 104 functions to convert sinusoidal AC power applied to a primary side of the transformer 104 to AC power (with different current and voltage characteristics than the primary side) at a secondary side of the transformer 104. According to an aspect, for example, the transformer 104 converts AC power from a higher voltage on the primary side to AC power with a lower voltage on the secondary side. For example, the AC voltage on the primary side may be 3-phase 480 Volts, and the AC voltage on the secondary may be 3-phase 70 Volts. Concomitantly, the AC current on the secondary side is higher than the AC current on the primary side. For example, the current on the secondary side may be 800 Amps while the current on the primary side may be 120 Amps. In the depicted embodiment, the primary side of the transformer 104 is an input side of the DC power supply system 100 that may be coupled to the AC grid of a power utility (either directly or through one or more other transformers co-located with the DC power supply system 100).

The depicted passive rectifier 110 generally functions to rectify the AC power on the secondary side of the transformer 104 to DC power that is applied to the load. As discussed further herein, the passive rectifier 110 may include passively switched devices (e.g., diodes) that can operate at high current levels (e.g., current levels exceeding 800 Amps). In the depicted embodiment, the secondary side of the transformer 104 and the passive rectifier 110 form a portion of a primary power path between the source of sinusoidal AC power and the DC load. In some modes of operation, for example, 70 percent or more of the power applied to the DC load is due to current that passes through the passive rectifier 110.

In contrast, the active rectifier 111 and the isolating DC-to-DC converter 113 are a part of the secondary power path that generally provides 30 percent or less of the power that is applied to the DC load. In this embodiment, the active rectifier 111 performs several functions including regulating the power that is applied to the DC load while simultaneously imparting non-sinusoidal voltage at the primary side of the transformer 104, which induces a non-sinusoidal voltage on the secondary side of the transformer 104. As discussed further herein, the non-sinusoidal voltage induced on the secondary side of the transformer 104 causes the passive rectifier 110 to draw sinusoidal current; thus providing high power quality that many power utilities desire or require. When operating, the active rectifier 111 draws real power that is propagated by galvanically-isolated coupling via the isolating DC-to-DC converter 113 to the load. Beneficially, the active rectifier 111 is coupled to the high voltage, low current, primary side of the transformer 104; thus, the active rectifier 111 may include readily available, actively switched devices, such as insulated gate bipolar transistors (IGBTs). Although not required in many applications, the active rectifier 111 may be current-regulated to drive a variety of different types of loads including negative-impedance loads.

As shown, a high voltage side of the DC-to-DC converter 113 is coupled to the active rectifier 111 and a low voltage side of the DC-to-DC converter 113 is coupled to the load. As discussed further herein, the isolating DC-to-DC converter 113 may operate as part of a control loop to regulate power applied to the load.

Figure 2:
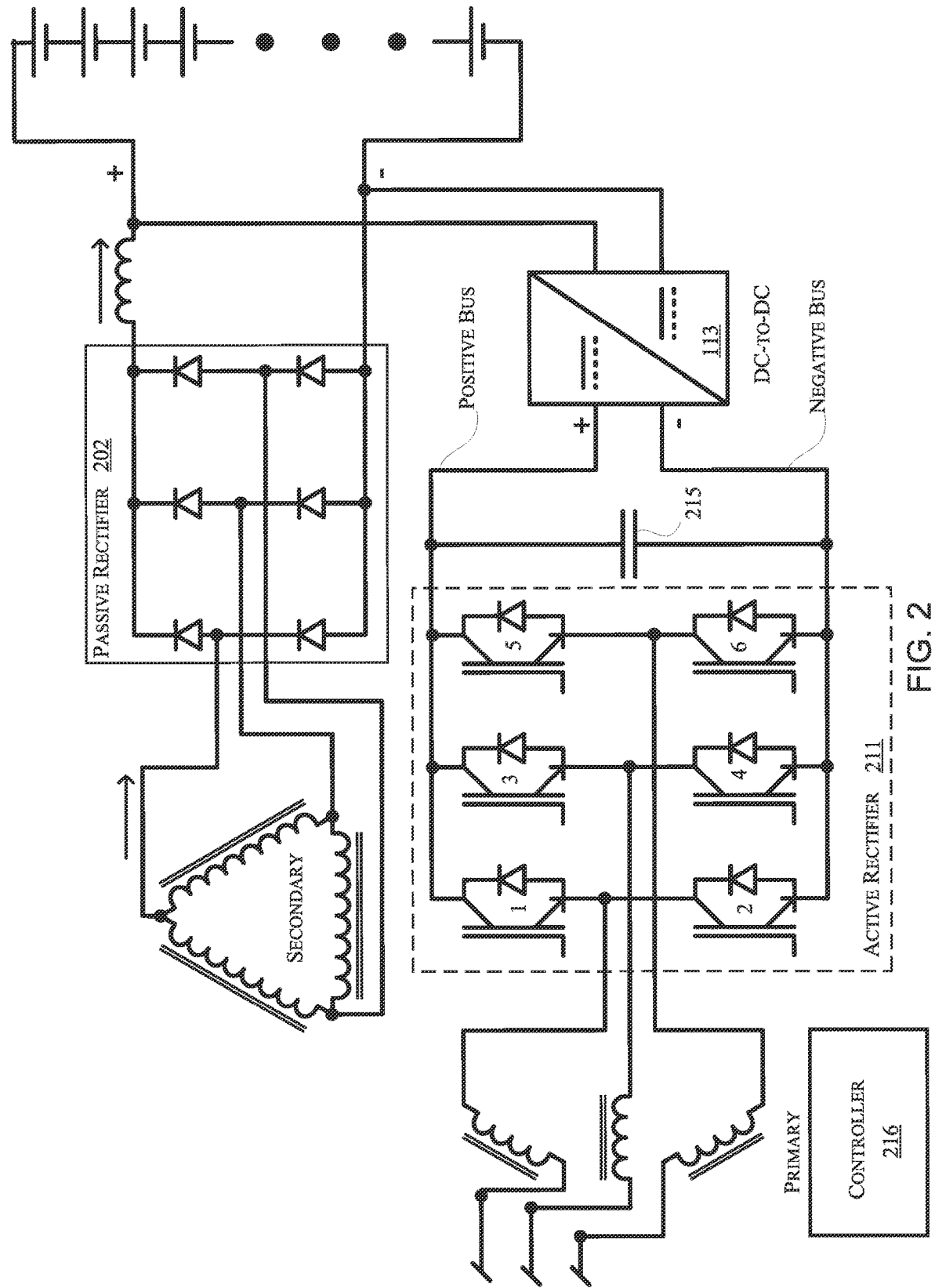
FIG. 2 is an embodiment of the power supply system depicted in FIG. 1.

Referring next to FIG. 2, shown is an embodiment of the DC power supply system 100 depicted in FIG. 1. As shown, the transformer 104 in this embodiment is implemented as a three-phase transformer including a grid-connectable primary side with three windings and a delta-arranged secondary side. An active rectifier 211 (implementing the active rectifier 111) in this embodiment is realized by six IGBTs configured as a three-phase, two-level bridge. As depicted, responsive to control signals from a controller 216 to gates of the IGBTs, the active rectifier 211 switchably connects each of the three primary windings in series between a positive bus and a negative bus (at the input of the DC-to-DC converter 113) to alter a magnetic flux in a core of the transformer. For simplicity, the connections between the controller 216 and the gates of the active rectifier 211 are not shown. A DC linking capacitor is disposed between the positive bus and the negative bus, and the output of the DC-to-DC converter 113 is coupled to the output of the passive rectifier 202 (which is an exemplary implementation of the passive rectifier 102). In this embodiment, the passive rectifier 202 is a six-pulse, two-level, passive rectifier that includes six diodes.

Figure 3:
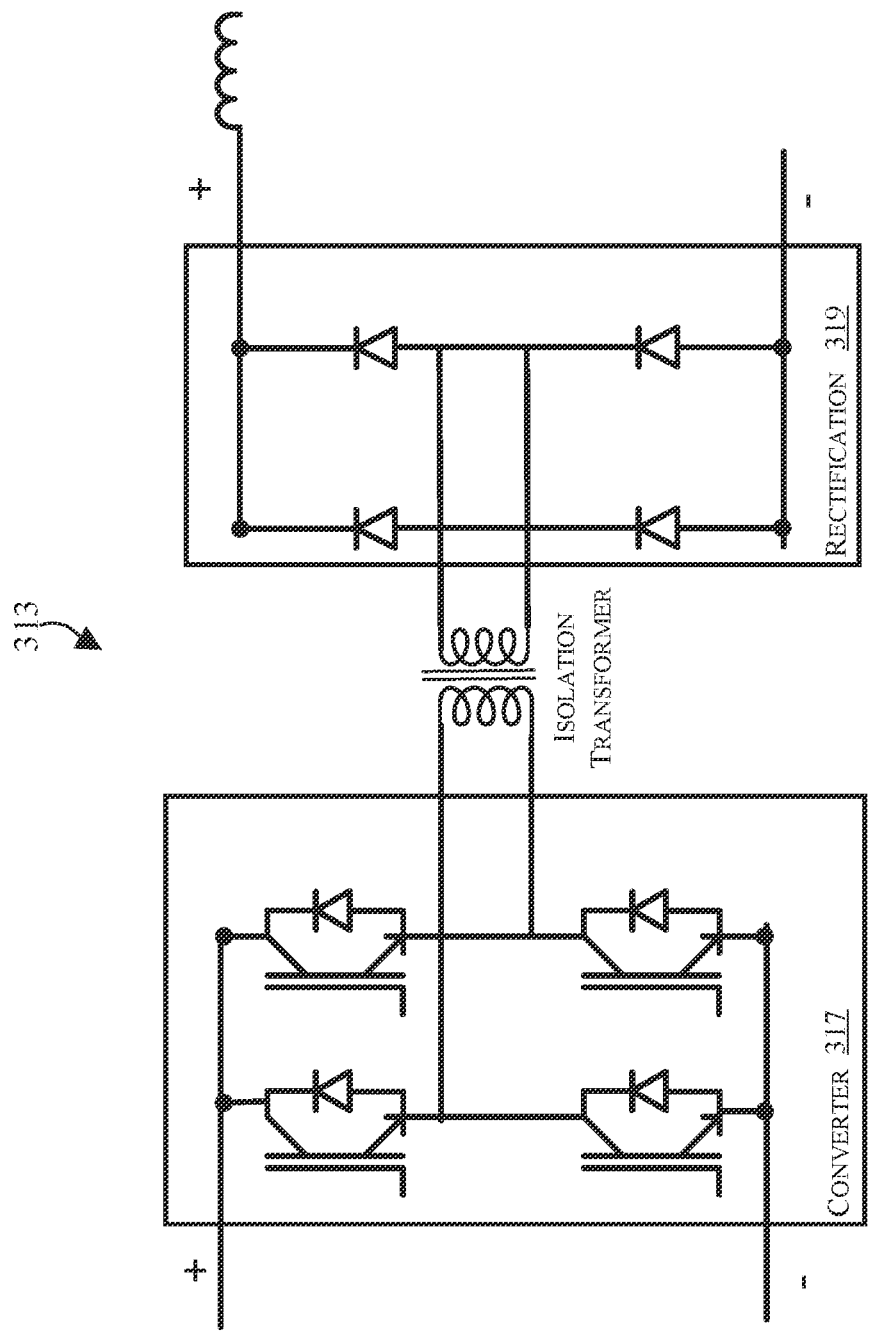
FIG. 3 depicts a DC-to-DC converter that may be used to realize the DC-to-DC converter depicted in FIGS. 1 and 2.

FIG. 3 depicts a DC-to-DC converter 313 that may be used to realize the DC-to-DC converter 113 depicted in FIG. 1. As shown, the DC-to-DC converter 313 includes a converter side 317, an isolation transformer, and a rectifier side 319. The converter side 317 functions to convert the DC power to a time-varying voltage to enable power to be inductively coupled via the isolation transformer to the rectification side 319 of the DC-to-DC converter 313. The rectification side 319 then converts that induced voltage at its input to a DC voltage that is applied to the output 112 of the DC power supply system 100. In operation, the switching devices (e.g., IGBTs) of the converter side 317 are switched so the bus voltage at the output of the active rectifier 111 is maintained while allowing the DC-to-DC converter 313 to function as a power sink for the active rectifier 111. The power drawn by the DC-to-DC converter 313 is then fed to the DC load via the isolation transformer and the rectification side 319 of the of the DC-to-DC converter 313.

Figure 4:
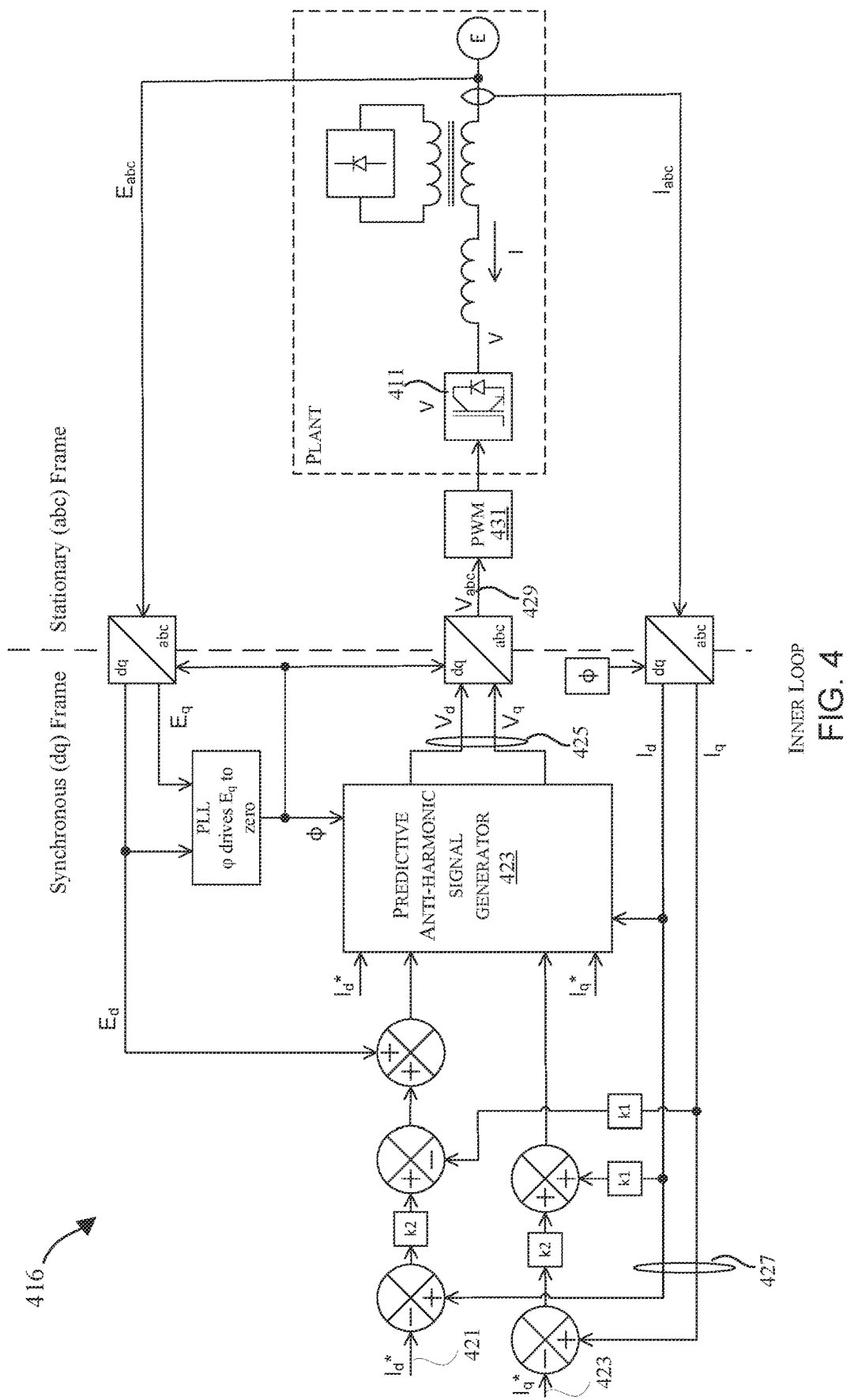
FIG. 4 is a diagram depicting an inner current control loop for the active rectifiers depicted in FIGS. 1 and 2.
Figure 5:
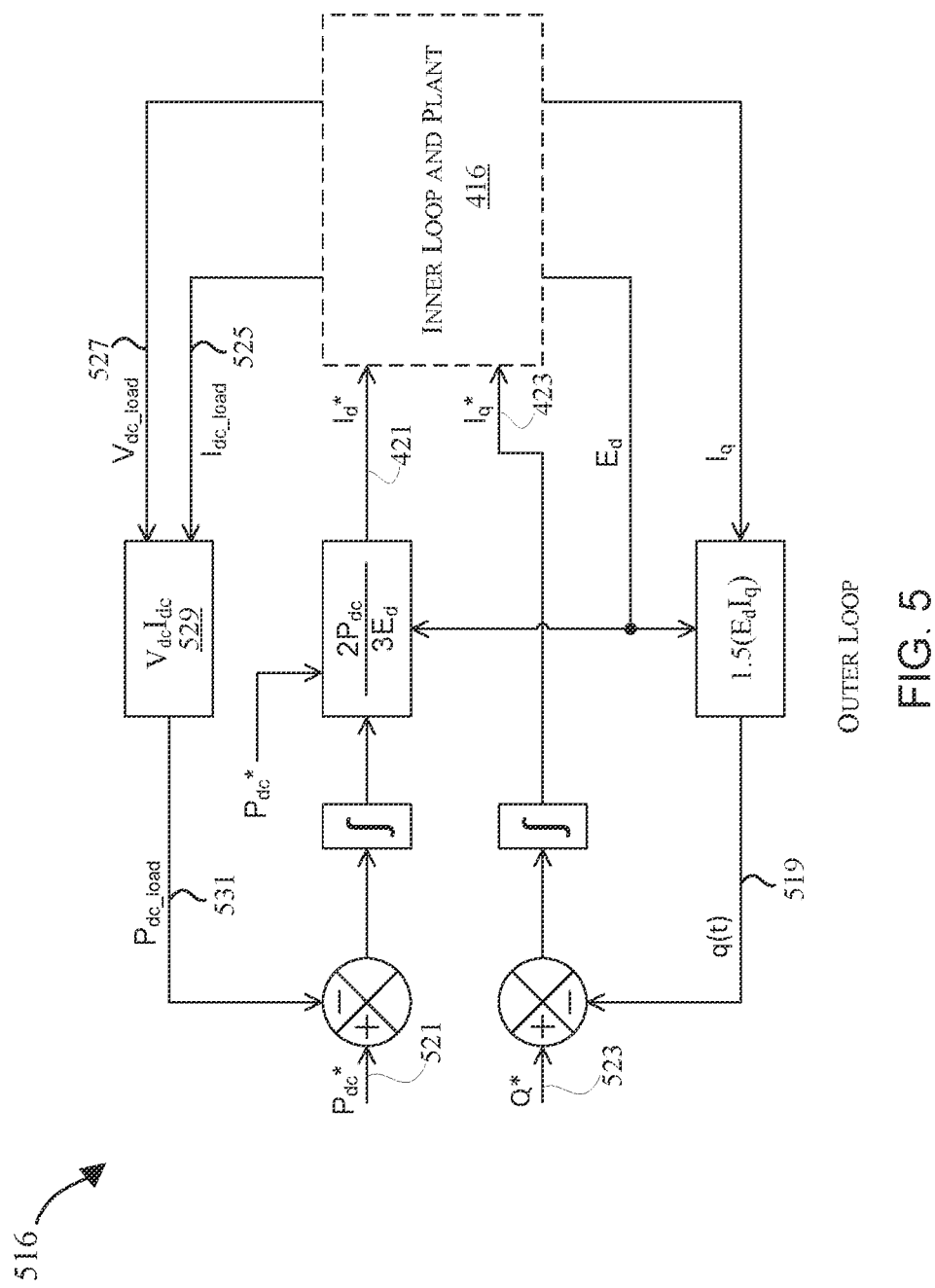
FIG. 5 depicts an outer loop control of the active rectifier depicted in FIGS. 1 and 2.

Referring next to FIGS. 4 and 5, shown are an exemplary inner current control loop 416 and exemplary outer loop control 516, respectively, that may be utilized to implement the controller 216 (depicted in FIG. 2) that controls the active rectifier 111. As shown in FIG. 5, dual setpoints are utilized: one for real power (set with a real power input 521) and one for reactive power (set with a reactive power input 523). The inner control loop 416 depicted in FIG. 4 regulates AC line current into the active rectifier 111, and includes dual inputs: one corresponding to real power (set with an Id input 421) and one for reactive power (set with an Iq input 423) combined with feedback 427 (measured current information) performed in a synchronous reference frame. The feedback errors are multiplied by gains (depicted as k2 blocks) and optionally integrated. Cross-product error correction is also performed in the synchronous reference frame. Line voltage feed forward inputs are added in the synchronous reference frame. Anti-harmonic predictive shaping is added with voltage and current setpoint scaling prior to synchronous-to-stationary reference frame conversion. A predictive anti-harmonic signal generator 423 is configured to assist the feedback control in creating the appropriate anti-harmonic compensating voltage at the AC connections of the active rectifier 111 while reducing the control speed (bandwidth) demands on the feedback controller. Scaling of the predictive anti-harmonic compensating voltage signal is directly (albeit not necessarily proportionally) related to the desired controlled current in the primary of the transformer 104. Line voltage information is fed to the anti-harmonic signal generator 423 in order to allow the anti-harmonic signal generator 423 to be adjusted so that sinusoidal transformer primary currents may be drawn even in the event that the utility line voltage is not sinusoidal. The compensated synchronous reference frame signals 425 are then transitioned to the stationary reference frame. In the stationary reference frame, the anti-harmonic compensated feedback signal 429 is fed to one or more pulse-width-modulators (PWM) 431, which may control the IGBTs of the active rectifier 211 (depicted as active rectifier 411 in FIG. 4) as one of ordinary skill in the art will appreciate in view of this disclosure.

Referring to FIG. 5, it depicts an outer loop control 516 of the active rectifier 111. The outer loop control 516 includes a reactive power feedback error 523 with integration and feed-back 519 from the utility voltage and current that subsequently feeds the quadrature axis current setpoint 423 of the inner loop controller 416. Additionally, combined current 525 from the passive rectifier 110 and the DC-to-DC converter 113 and voltage 527 at the output 112 are measured and multiplied by a multiplier 529 for a DC power feedback signal 531 that is compared with the desired power setpoint 521. This power feedback loop is scaled and integrated and potentially combined with and an outer-loop feed forward whose output is subsequently fed to the direct-axis current setpoint input 421 of the inner loop controller. Regulation of the DC bus 109 shared by the active rectifier 111 and the input to the DC-to-DC converter 113 is performed by the DC-to-DC converter 113. As such, the DC-to-DC converter 113 processes all amounts of power from its input to its output to maintain the voltage of the DC bus 109.

Figure 6:
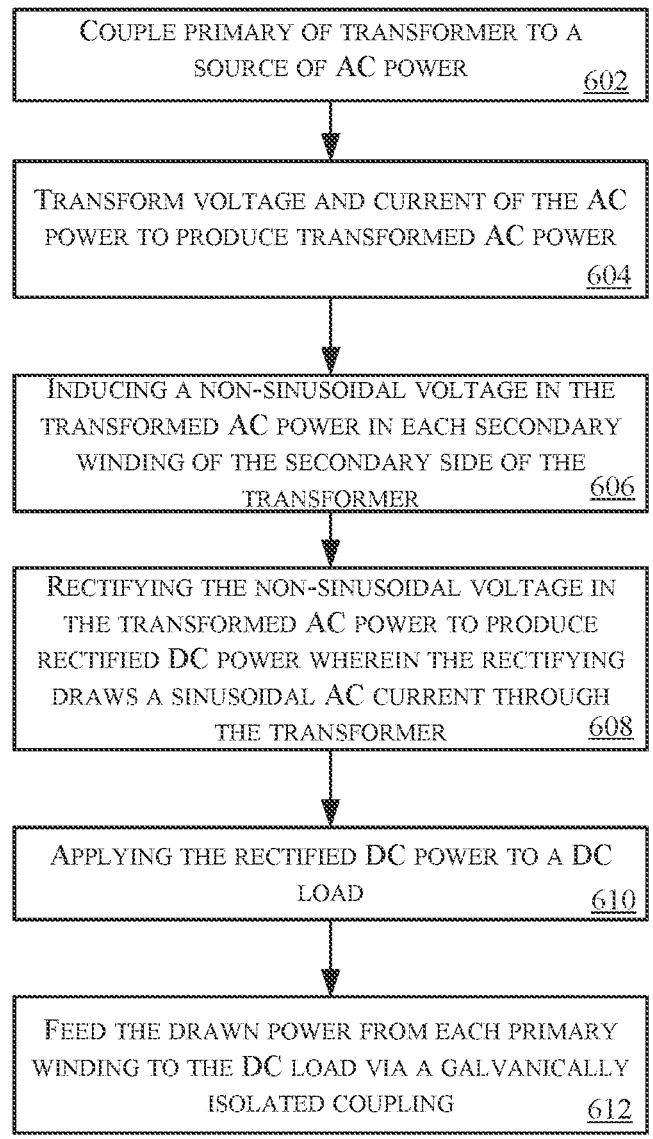
FIG. 6 is a flowchart depicting an exemplary method that may be traversed in connection with the embodiments depicted in FIGS. 1-5.
Figure 7:
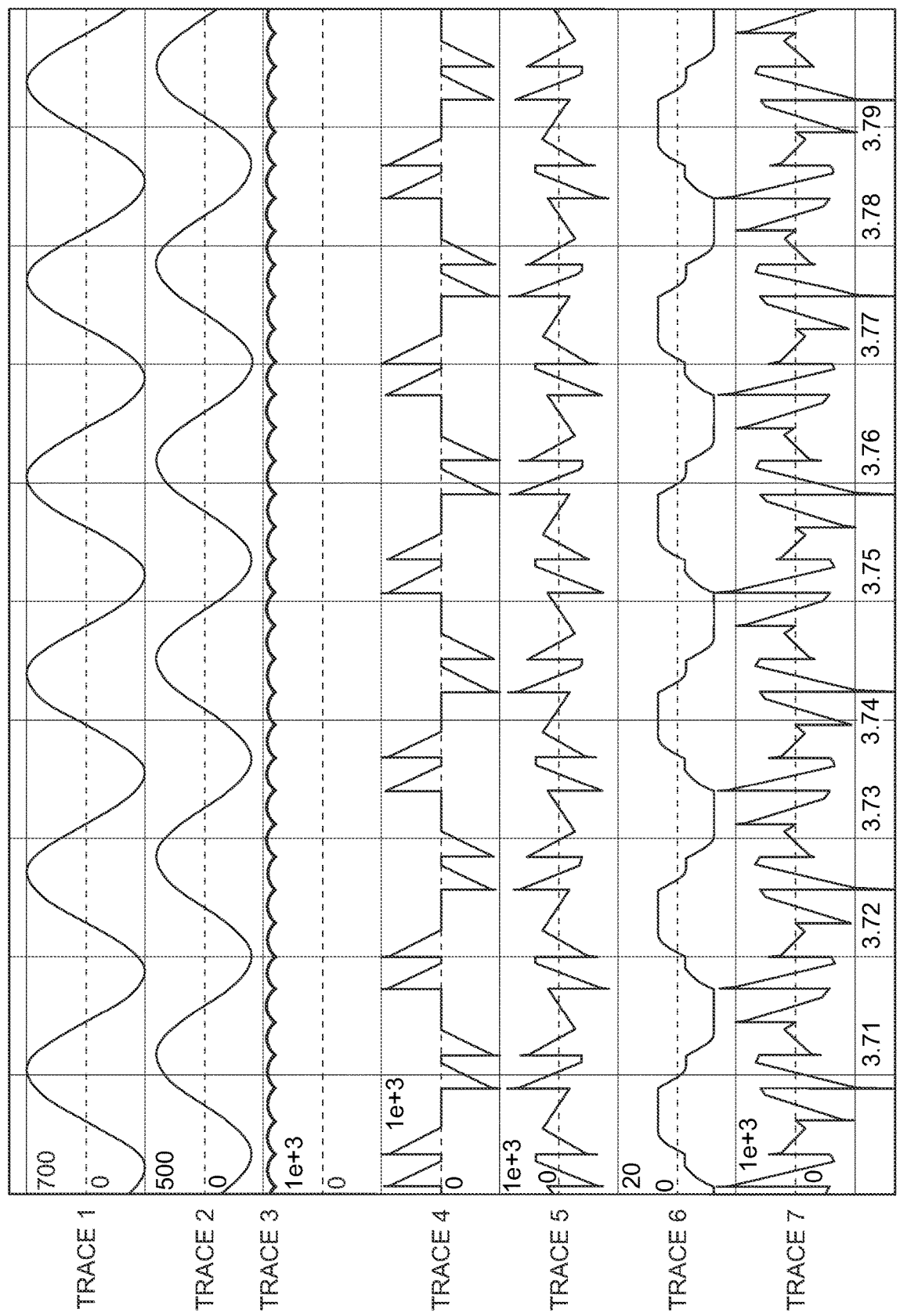
FIG. 7 is a diagram depicting multiple traces where each trace represents a characteristic of power in the embodiments of FIGS. 1-5.

While referring to FIGS. 1-5, simultaneous reference is made to FIG. 6 (which is a flowchart depicting an exemplary method that may be traversed in connection with the embodiments depicted in FIGS. 1-5) and FIG. 7 (which is a diagram depicting multiple traces where each trace represents a characteristic of power in the embodiments of FIGS. 1-5). As shown, when the primary side of the transformer 104 is coupled to a source of AC power (e.g., a utility power grid) (Block 602), the transformer 104 transforms the voltage and current of the AC power to produce transformed AC power that is applied to the passive rectifier 110 (Block 604). In FIG. 7, Traces 1 and 2 depict line-to-line voltage and line current of the AC power at the AC grid connection, respectively. As discussed above, the AC power that is applied to the passive rectifier 110 is a primary source of power that is applied to the DC load. But a minority of the power that is applied to the DC load feeds through the secondary power path that includes the active rectifier 111 and the isolating DC-to-DC converter 113.

The minority of the power (applied via the secondary power path) is utilized to induce a non-sinusoidal voltage in the transformed AC power in each secondary winding of the transformer 104 (Block 606). More specifically, in the embodiment depicted in FIG. 2, each IGBT in the active rectifier switchably connects one of the primary windings to one of either the positive bus or the negative bus; thus each IGBT, when conducting, couples one of the primary windings in series between a phase of the AC grid and one of the positive bus or the negative bus. In this way, power from each winding of the transformer may be switchably drawn, simultaneously with the transformation of the AC power (from a high voltage to a lower voltage), to add a resultant non-sinusoidal voltage on each phase of the primary windings. In FIG. 7, Trace 4 depicts an exemplary resultant non-sinusoidal voltage across each winding of the primary windings, and Trace 5 represents a non-sinusoidal line-to-virtual-neutral voltage added to a phase of the AC power. The waveform depicted in Trace 5 is a generated waveform fed to the pulse width modulator (PWM) 431 depicted in FIG. 4 (it does not represent a waveform that can be sensed with voltage probes connected to conductors of the embodiment in FIG. 2). Trace 7 depicts a line-to-line voltage at the terminals (on the AC side) of the active rectifier 111. The non-sinusoidal voltage added to each primary winding, in turn, induces a non-sinusoidal voltage in the transformed AC power in each secondary winding of the secondary side of the transformer 104. Trace 6 in FIG. 7 depicts the resultant, altered magnetic flux in the core of a phase leg of the transformer 104.

The non-sinusoidal voltage in the transformed AC power is then rectified to produce rectified DC power (Block 608), and the switching action of the diodes causes a sinusoidal AC current to be drawn by the transformer 104. In FIG. 7, Trace 3 depicts load current at the output of the rectifier. The rectified DC power is then applied to the DC load (Block 610). Although the rectified DC power includes some ripple, the ripple does not adversely affect the DC load, and the AC current drawn by the DC power supply is a very clean, sinusoidal voltage that is closely aligned with the AC grid voltage. Thus, from a power-utility perspective, the low harmonics and high power factor render the DC power supply system 100 a very favorable load. As shown in FIG. 6, the power drawn from each primary winding (by the active rectifier) is fed via the galvanically isolated coupling of the DC-to-DC converter 113 to the DC load (Block 612). It should be recognized that the order of the listed operations in FIG. 6 is exemplary only, and that operations depicted in FIG. 6 may be performed in another order.

Instructions associated with aspects of the method depicted in FIG. 6 may be encoded in a non-transitory, tangible processor readable storage medium (for execution by a processor). In addition, or in the alternative, instructions to configure a field programmable gate array (FPGA) to perform aspects of the method may be stored in a non-transitory, tangible processor readable storage medium. These instructions may be encoded in non-transitory memory and implemented with a processor and/or FPGA as a portion of the controller 216 (e.g., to realize the inner control loop 416 and out loop 516). It is certainly contemplated that other types of hardware devices may also be used to carry out one or more aspects of the method of FIG. 6—as one of skill in the art in view of this disclosure will appreciate.

Figure 8:
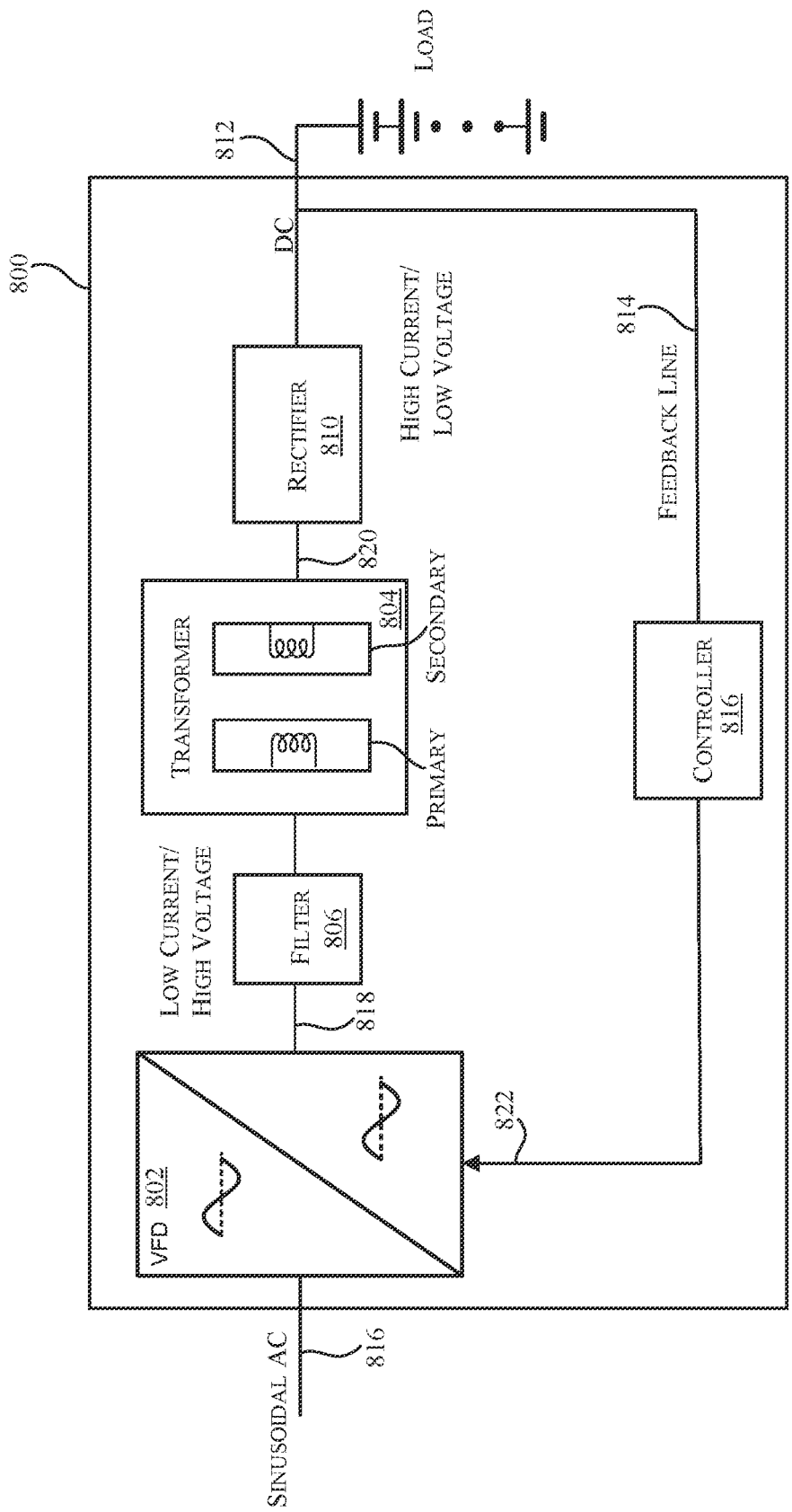
FIG. 8 is another embodiment of a DC power supply system.

Referring next to FIG. 8, shown is another embodiment of a DC power supply 800. As shown, the DC power supply 800 in this embodiment includes a variable frequency drive (VFD) 802 coupled to a primary side of a transformer 804 via an optional filter 806. A passive rectifier 810 is coupled between a secondary side of the transformer 804 and an output 812 of the DC power supply 800. Also coupled to the output 812 of the DC power supply 800 is a feedback line 814 that is coupled to a controller 816, and the controller 816 is coupled to the VFD 802 to enable adjustments (to an operation of the VFD) to be made on the secondary (low-current/high-voltage) side of the transformer 804 to effectuate desired power characteristics (e.g., a desired current and/or voltage level) at the output of the rectifier 810. Beneficially, the level of control provided by the VFD 802 on the high voltage side enables low-cost, passive Schottky diodes to be utilized in the rectifier 810 on the secondary (low-voltage/high-current) side of the power supply 800. And the VFD 802 may be a mass-produced, "off the shelf" component that is relatively inexpensive; thus, the depicted DC power supply 800 may be implemented is a cost-viable approach to providing DC power.

In general, the VFD 802 is configured to convert AC power at an input 816 of the VFD 802 to controlled AC power that is applied at an output 818 of the VFD 802. The optional filter 806 removes noise in the controlled AC power that may be generated by the VFD 802 during the AC-to-AC conversion. The transformer 804 is disposed and configured to step down the controlled AC voltage so that the AC power applied to the rectifier 810 is a secondary (low-voltage-high-current) side of the transformer 804. The passive rectifier 810 is configured to rectify the transformed AC power (at an output 820 of the transformer 804) to DC power. Although not depicted in FIG. 8 for simplicity, at least one sensor (e.g., a current and/or voltage sensor) may be coupled to the output of the rectifier 810 to monitor one or more aspects of the DC power and used to provide a feedback signal (via the feedback line 814) to the controller 816. In turn, the controller 816 operates to provide a control input 822 to the VFD 802 to adjust the controlled AC power (output from the VFD 802 at the VFD output 818) in response to changes to the one or more characteristics (e.g., voltage and/or current) of the DC power.

Figure 9:
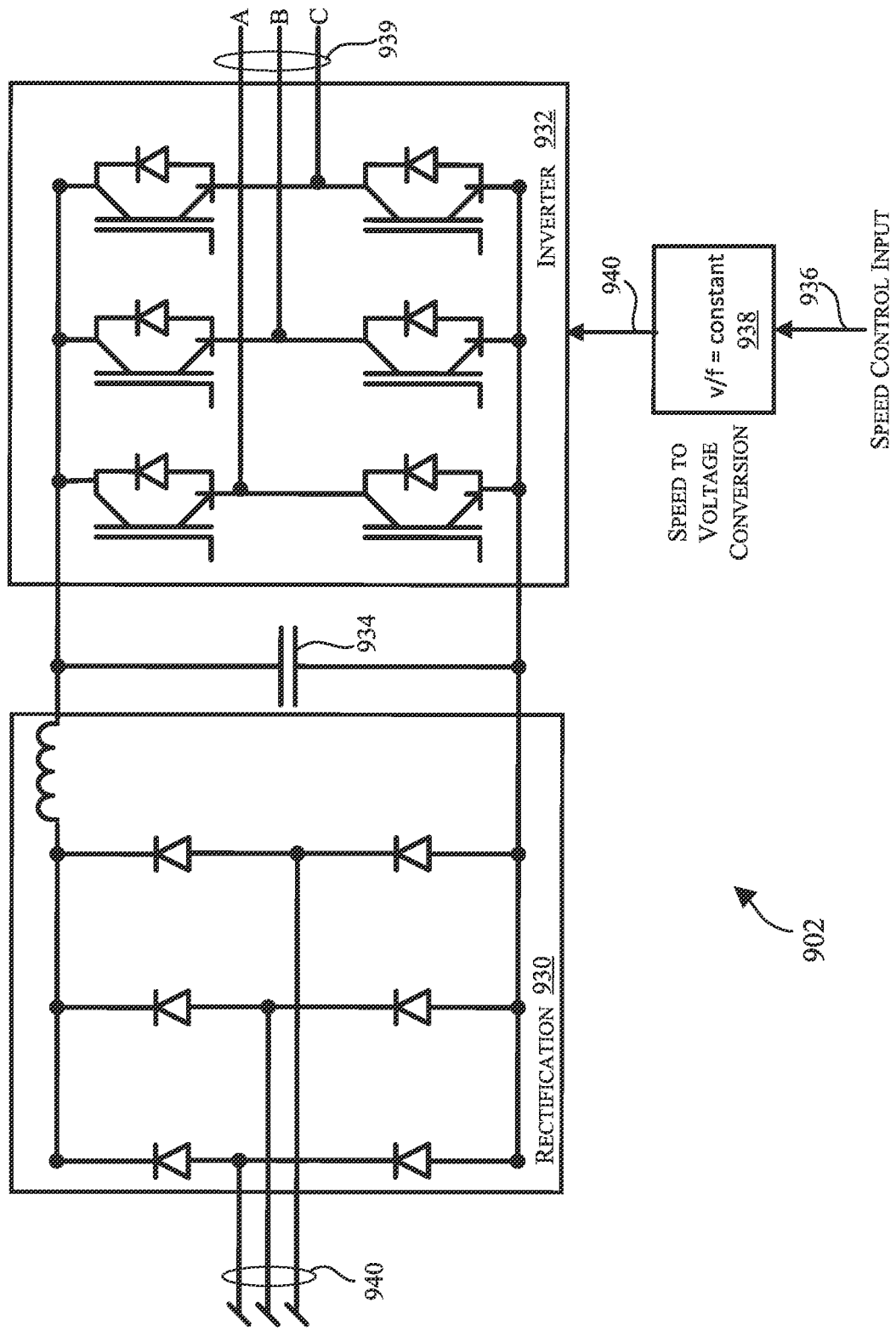
FIG. 9 depicts an exemplary VFD that may be used to realize the VFD depicted in FIG. 8.

Referring next to FIG. 9, shown is an exemplary VFD 902 that may be used to realize the VFD 802 depicted in FIG. 8. The VFD 902 in this embodiment includes a rectification portion 930, an inverter portion 932, a DC linking capacitor 934 between the rectification portion 930 and the inverter portion 932, a speed-control input 936, and a speed-to-voltage conversion module 938. The rectification portion 930 of the VFD 902 is configured to rectify a three-phase sinusoidal input (e.g., from a utility grid) to a DC voltage that is applied across the DC linking capacitor 934. The inverter portion 932 is configured to produce a controlled AC voltage at an output 939 of the VFD 902 that is controlled based upon the speed-control input 936. The speed-to-voltage conversion module 938 is configured to convert the speed-control input 936 to a voltage-control-input 940 so that the speed-control input 936 controls the voltage of the controlled AC power at the output 939 of the VFD 902.

The VFD 902 depicted in FIG. 9 may be any readily available VFD that may be used in many applications to drive an AC motor. But in the VFD 902 of FIG. 9, the speed-control input 936 is used to adjust a voltage of the controlled AC power, and hence, the voltage that is applied at the output 939 of the VFD 902. In some implementations, the inverter portion 932 will also vary its output frequency in proportion to the controlled AC voltage, but variations in the frequency of the controlled AC power do not adversely affect either the transformer 804 or the rectifier 810 (depicted in FIG. 8).

Figure 10:
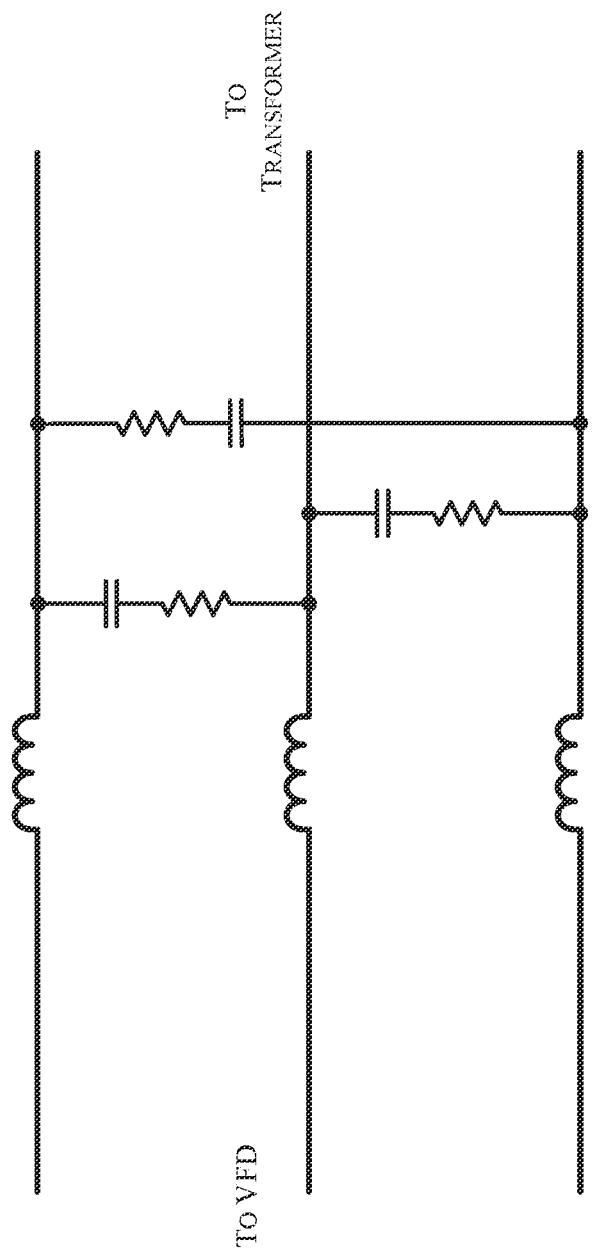
FIG. 10 is an exemplary filter that may be utilized to realize the optional filter in FIG. 8.

Referring to FIG. 10, shown is an exemplary filter that may be utilized to realize the optional filter in FIG. 8. The depicted filter is configured to be implemented in connection with three-phase embodiments to filter any noise at the output of the VFD 802. As one of ordinary skill in the art will appreciate, the inductor, capacitor, and resistor associated with each phase of the filter may be sized to filter specific undesirable frequencies that result from the VFD 802. In some embodiments, the filter is completely unnecessary because the VFD 802 provides sufficiently clean AC power to the transformer 804.

Figure 11:
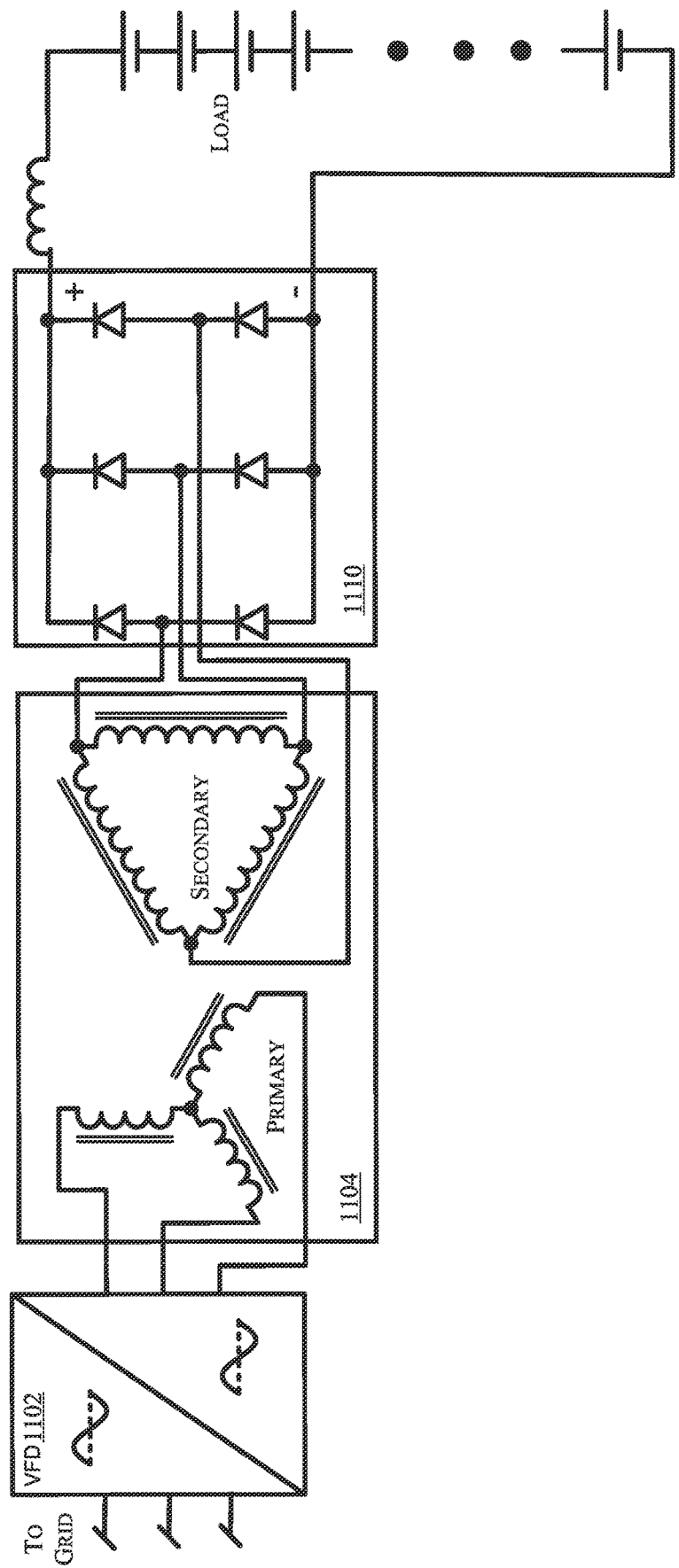
FIG. 11 is an embodiment of the power system depicted in FIG. 8 in which the VFD is realized by a three-phase VFD.

Referring next to FIG. 11, shown is an embodiment of the DC power system 800 of FIG. 8 in which the VFD 802 is realized by a three-phase VFD 1102, the transformer 804 is realized by a three-phase wye-delta-type transformer 1104, which has three inputs on a primary side (for each of three phases output from the VFD) and three outputs on a secondary side, which provide three phases to the passive rectifier 806. In the embodiment depicted in FIG. 11, the passive rectifier 806 is implemented as a six-pulse diode rectifier 1110.

Figure 12:
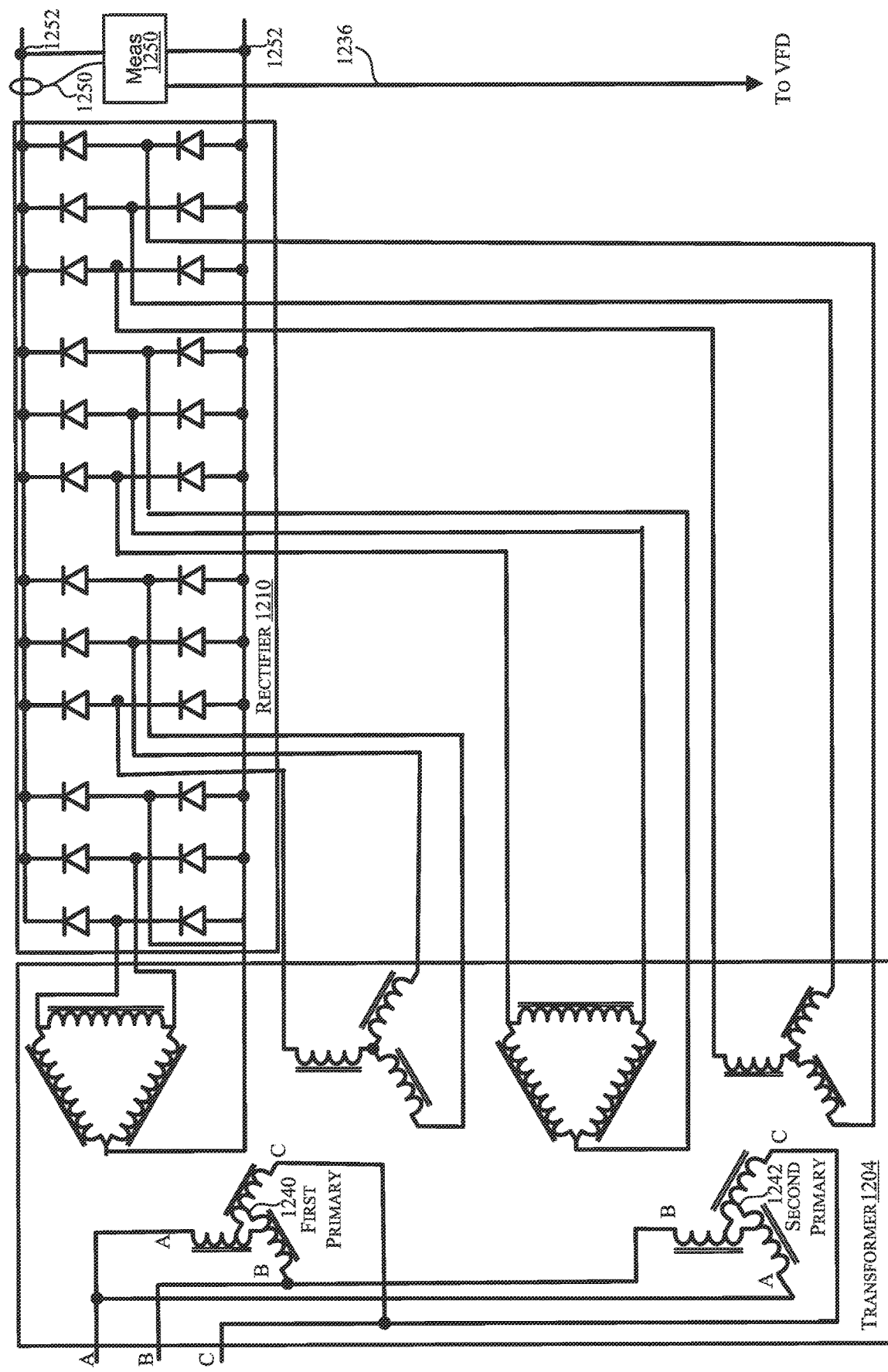
FIG. 12 is a diagram depicting a transformer and a passive rectifier that may be used to realize the transformer and rectifier, respectively, depicted in FIG. 8.

Referring to FIG. 12, shown are a transformer 1204 and a passive rectifier 1210 that may be used to realize the transformer 804 and rectifier 810, respectively, depicted in FIG. 8. In this embodiment, the transformer 1204 is configured as two, 6 pulse transformers to provide, as an output to the rectifier 1210, 12 distinct phases of AC power where each phase is separated from another phase by 15 degrees. As shown, each of the three phases of the AC source power (phases A, B, and C) is applied to the two transformer-primaries (a first primary 1240 and a second primary 1242 where the first primary 1240 and the second primary 1242 are swapped in phase sequence to provide for the phase difference between the 6 pulses of each transformer portion.

The rectifier portion 810 in this implementation is a passive, 24-pulse rectifier 1210. A current sensor 1250 and voltage sensor 1252 are shown at an output of the rectifier 1210, and in this embodiment, a speed-control signal 1236 for the VFD 902 is generated based upon the sensed current. As discussed above with reference to FIG. 9, the VFD 802 may include a speed-control input (e.g., the speed control input 936); thus, the speed-control signal 1236 in this embodiment is generated to accommodate the speed-control input constraints of a VFD (e.g., the VFD 902) with a speed control input (e.g., the speed control input 936). The speed-to-voltage converter 938 of the VFD 902 (of FIG. 9) converts the speed-control input 936 to a corresponding frequency and voltage, so the speed-control signal 1236 effectively controls a voltage of the controlled AC power provided by the VFD 902. In this way, current of the DC power may be regulated by adjusting the speed-control input of the VFD 902.

Figure 13:
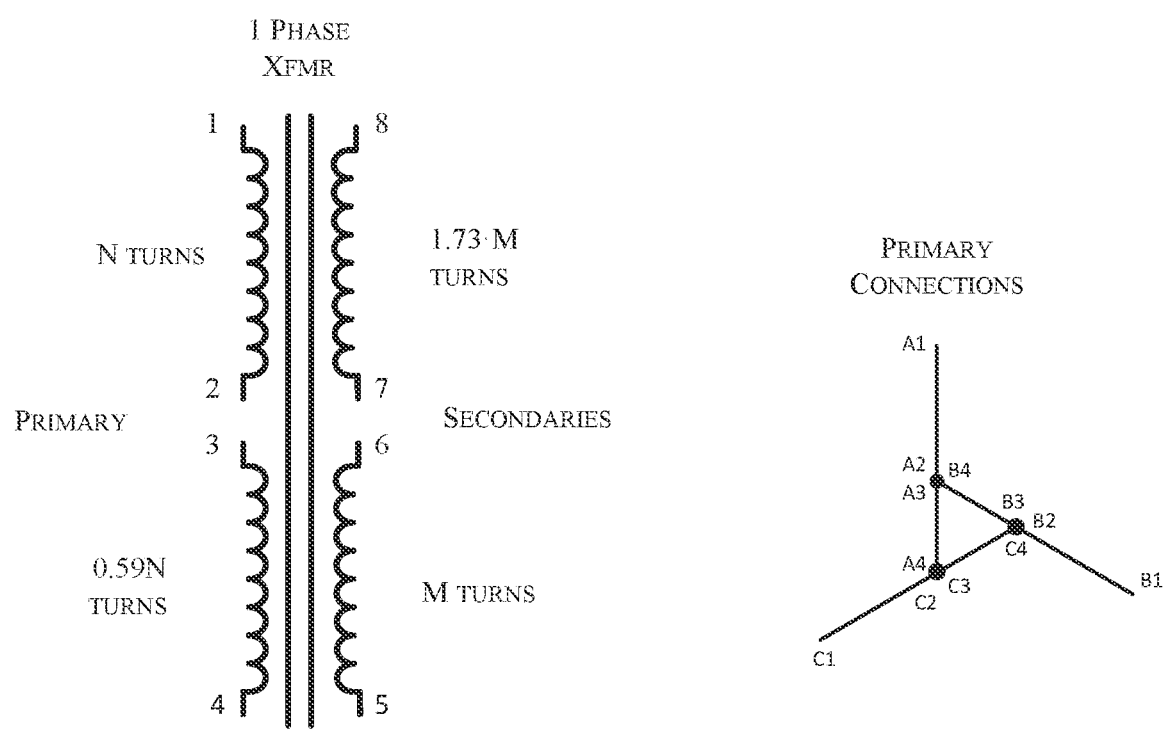
FIG. 13 depicts an embodiment in which the transformer of FIG. 12 may be realized by utilizing individual single-phase transformers.

Referring to FIG. 13, shown is an embodiment in which the transformer of FIG. 12 may be realized by utilizing individual single-phase transformers. More specifically, a left side of FIG. 13 depicts a single-phase transformer with nodes 1 and 2 providing connections for one primary (e.g., the first primary 1240) and nodes 3 and 4 providing connections for another primary (e.g., the second primary 1242) of the transformer 1204. Nodes 5 and 6 provide connections for one secondary which appears as a phase of a Y-connected secondary of transformer 1204. Nodes 7 and 8 provide connections for another secondary of the single-phase transformer which appears a phase of a Delta-connected secondary of 1204. Also shown in FIG. 13 is a depiction of how three of the single-phase transformers (A, B, and C) may be connected at a primary side of the transformers.

Figure 14:
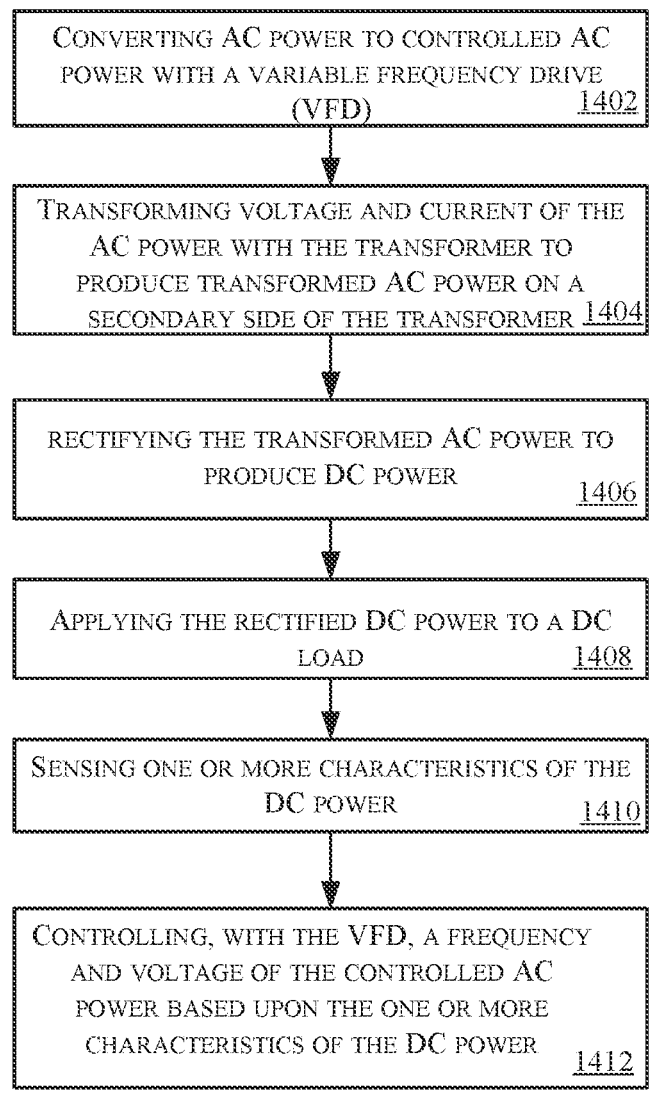
FIG. 14 is a flowchart depicting a method that may be traversed in connection with the embodiments described with reference to FIGS. 8-13.

Referring to FIG. 14, shown is a flowchart depicting a method that may be traversed in connection with the embodiments described with reference to FIGS. 8-13. As shown, AC power (e.g., from an AC grid) is converted by the VFD 802 to a controlled AC power (Block 1402). The voltage and current of the AC power is then transformed (e.g., by the transformer 804) to produce transformed AC power on a secondary side of the transformer (Block 1404). The transformed AC power is then rectified (e.g., by rectifier 810) to produce DC power (Block 1406). The rectified DC power is then applied to a DC load (Block (1408). One or more characteristics of the rectified DC power are sensed (Block 1410), and the controller 816 is configured to provide the control input 822 to the VFD 802 to adjust the controlled AC in response to changes to the one or more characteristics of the DC power (Block 1412). Although the control input 822 to the VFD 802 may be a speed-control signal in some implementations, in other implementations, the VFD 802 may be configured with a voltage-control-input that enables the feedback line (from a sensor at an output of the rectifier) to be proportional to a desired controlled AC voltage. It should be recognized that the order of the listed operations in FIG. 14 is exemplary only, and that the operations depicted in FIG. 14 may be performed in another order.

Instructions associated with aspects of the method depicted in FIG. 14 may be encoded in a non-transitory, tangible processor readable storage medium (for execution by a processor). In addition, or in the alternative, instructions to configure an FPGA to perform aspects of the method may be stored in a non-transitory, tangible processor readable storage medium. It is certainly contemplated that other types of hardware devices may also be used to carry out one or more aspects of the method of FIG. 14—as one of skill in the art in view of this disclosure will appreciate.

Figure 15:
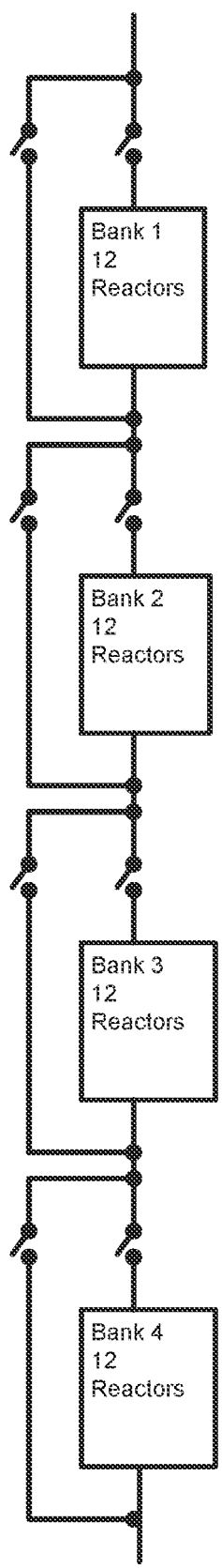
FIG. 15 depicts an exemplary DC load that may be used to realize the DC loads depicted herein.

Referring to FIG. 15, shown is an exemplary DC load that may be used to realize the DC loads depicted herein. In this embodiment, four reactor banks are arranged in series, and each reactor bank may be switched in and out of the series connection. The ideal voltage applied to each bank may vary depending upon the characteristics of the load of each bank, but in an embodiment, each bank may include twelve cells, and each cell may operate at a target voltage of 1.67 Volts. So, the DC load in FIG. 15 may be about 80 Volts when each of the banks is switched into the series connection, but again, the voltage of each bank and the total voltage of the series connection may vary. The Incorporated Applications for Patent disclose several different embodiments of electrochemical loads.

Figure 16:
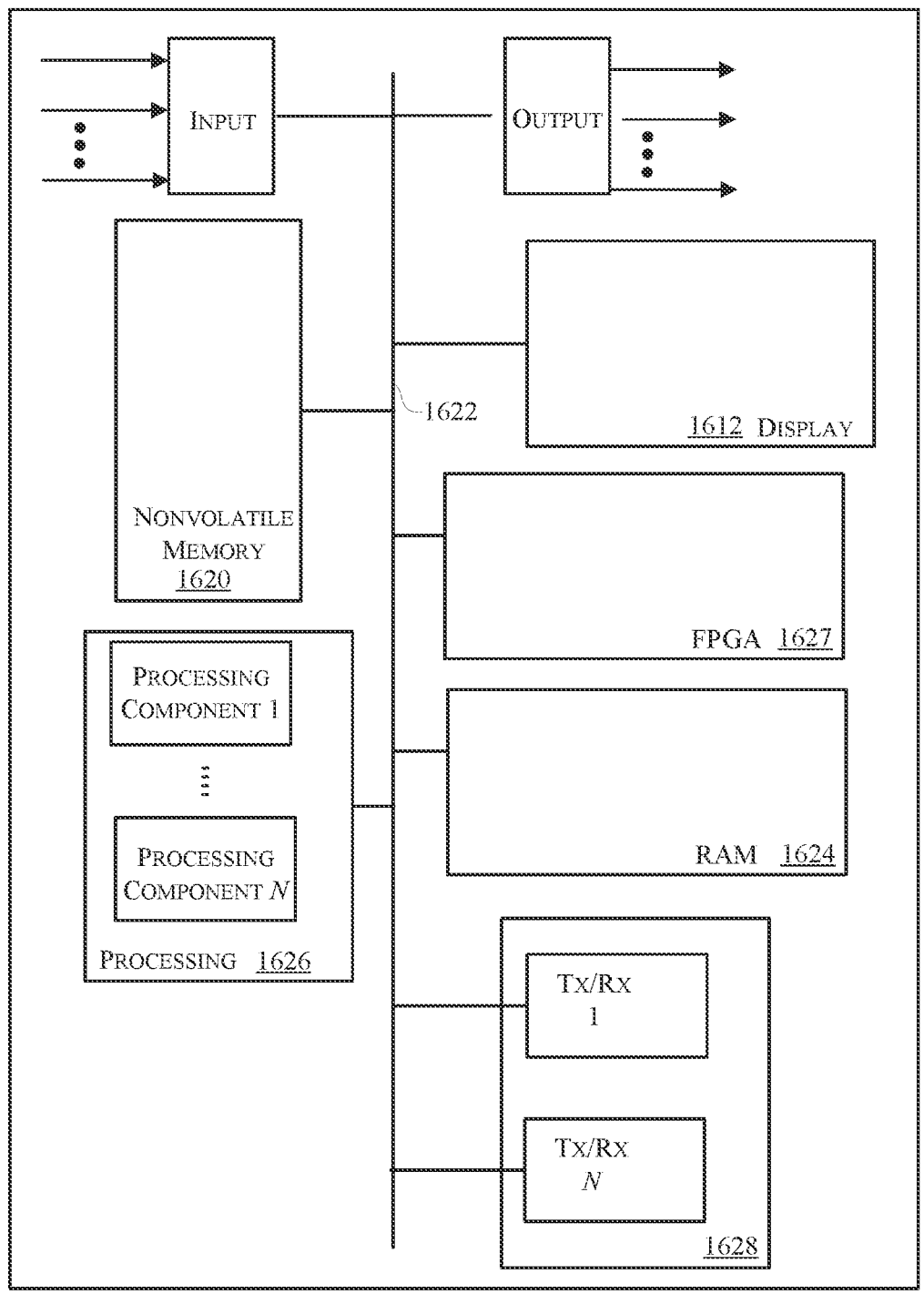
FIG. 16 is a block diagram depicting physical components that may be used to realize aspects of the control loops and controllers disclosed herein.

Referring FIG. 16, shown is a block diagram depicting physical components that may be utilized to realize the one or more aspects of the embodiments disclosed herein. For example, aspects of the controllers (e.g., controller 216, 816) and control systems (e.g., control loops 416, 516) disclosed herein may be realized by the components of FIG. 16. As shown, in this embodiment a display portion 1612 and nonvolatile memory 1620 are coupled to a bus 1622 that is also coupled to random access memory ("RAM") 1624, a processing portion (which includes N processing components) 1626, a field programmable gate array (FPGA) 1627, and a transceiver component 1628 that includes N transceivers. Although the components depicted in FIG. 16 represent physical components, FIG. 16 is not intended to be a detailed hardware diagram; thus, many of the components depicted in FIG. 16 may be realized by common constructs or distributed among additional physical components. Moreover, it is contemplated that other existing and yet-to-be developed physical components and architectures may be utilized to implement the functional components described with reference to FIG. 16.

This display portion 1612 generally operates to provide a user interface for an operator of the power supply systems described herein. The display may be realized, for example, by a liquid crystal display or AMOLED display, and in several implementations, the display is realized by a touchscreen display to enable an operator of the power supply systems to modify control aspects and to view operating parameter-values (e.g., current, voltage, operating trends, etc.) of the disclosed power supply systems. In general, the nonvolatile memory 1620 is non-transitory memory that functions to store (e.g., persistently store) data and processor executable code (including executable code that is associated with effectuating the methods described herein). In some embodiments for example, the nonvolatile memory 1620 includes bootloader code, operating system code, file system code, and non-transitory processor-executable code to facilitate the execution of the functionality of the logic and control components described herein.

In many implementations, the nonvolatile memory 1620 is realized by flash memory (e.g., NAND or ONENAND memory), but it is contemplated that other memory types may also be utilized. Although it may be possible to execute the code from the nonvolatile memory 1620, the executable code in the nonvolatile memory is typically loaded into RAM 1624 and executed by one or more of the N processing components in the processing portion 1626.

The N processing components in connection with RAM 1624 generally operate to execute the instructions stored in nonvolatile memory 1620 to facilitate execution of the methods disclosed herein. For example, non-transitory processor-executable instructions to effectuate aspects of the methods described with reference to FIGS. 6 and 14 may be persistently stored in nonvolatile memory 1620 and executed by the N processing components in connection with RAM 1624. As one of ordinarily skill in the art will appreciate, the processing portion 1626 may include a video processor, digital signal processor (DSP), graphics processing unit (GPU), and other processing components.

In addition, or in the alternative, the FPGA 1627 may be configured to effectuate one or more aspects of the methodologies described herein. For example, non-transitory FPGA-configuration-instructions may be persistently stored in nonvolatile memory 1620 and accessed by the FPGA 1627 (e.g., during boot up) to configure the FPGA 1627 to effectuate one or more functions of the control and logic components described herein. As an example, the FPGA 1627 may include a lookup table to perform conversions (described with reference to FIG. 4) from the stationary reference frame to the synchronous reference frame and vice versa.

As one of ordinary skill in the art in view of this disclosure will appreciate, the depicted input and output modules may be used for several different purposes. Sensors, for example, may be coupled to the input module, and the output module may generate control signals. As a specific example, the feedback line 814 depicted in FIG. 8 may couple to the input module, and the output module may produce the speed-control signal 936 described with reference to FIG. 9. Logic to vary the speed-control signal 936 as a function of the current applied to the load may be stored in non-volatile memory 1620 as non-transitory processor-executable code, which is executable by the processing portion 1626.

The depicted transceiver component 1628 includes N transceiver chains, which may be used for communicating with external devices via wireless or wireline networks. Each of the N transceiver chains may represent a transceiver associated with a particular communication scheme (e.g., WiFi, Ethernet, Modbus, CDMA, Bluetooth, NFC, etc.).

It should be recognized that various aspects of particular implementations described with reference to separate drawing figures may be combined. For example, sensors and control components described with reference to FIG. 4 may be implemented in the variations of the embodiment depicted in FIG. 1. Similarly, the current sensor 1250 and voltage sensors 1252 depicted in FIG. 12 may be implemented in any of the variations of the embodiment depicted in FIG. 8. One of ordinary skill in the art will readily appreciate that FIGS. 2-7 depict variations of the embodiment depicted in FIG. 1 that may be combined, but to avoid prolixity, all of the potential permutations are not separately depicted and described. Similarly, aspects of the variations of the embodiment depicted in FIG. 8 described with reference to FIGS. 9-14 may be combined to create variations of the embodiment described with reference to FIG. 8.

Those of skill would further appreciate that the various illustrative logical blocks, modules, circuits, and algorithm steps described in connection with the embodiments disclosed herein may be implemented as electronic hardware, or computer software in connection with hardware. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An AC to DC power supply system comprising:
a transformer having a primary side and a secondary side;
a passive rectifier coupled to the secondary side of the transformer, the passive rectifier configured to rectify AC power at the secondary side to DC power at an output of the passive rectifier;
an active rectifier coupled to the primary side of the transformer, the active rectifier configured to control voltages applied to the primary side of the transformer to induce a non-sinusoidal voltage at the secondary side of the transformer and a sinusoidal current drawn by the passive rectifier; and
an isolating DC-to-DC converter coupled between the active rectifier and the output of the passive rectifier to magnetically couple power from the active rectifier to the output of the passive rectifier while galvanically isolating the active rectifier from the output of the passive rectifier.

2. The AC to DC power supply system of claim 1, wherein the active rectifier is configured to impart harmonics on the primary side of the transformer to induce non-sinusoidal voltages on the secondary side of the transformer.

3. The AC to DC power supply system of claim 1, wherein the passive rectifier draws the sinusoidal current during rectification of the non-sinusoidal voltage.

4. The AC to DC power supply system of claim 1, wherein the DC-to-DC converter is configured to feed power from the active rectifier to the output of the passive rectifier while galvanically isolating the active rectifier from the output of the passive rectifier.

5. The AC to DC power supply system of claim 1, further comprising a DC load connected to the output of the passive rectifier and to an output of the DC-to-DC converter, and where in each of the passive rectifier and the DC-to-DC converter supplies a portion of DC power drawn by the DC load.

6. The AC to DC power supply system of claim 5, wherein the passive rectifier supplies a majority of power applied to the DC load and the DC-to-DC converter supplies a minority of power applied to the DC load.

7. The AC to DC power supply system of claim 6, wherein the passive rectifier supplies at least 70% of power applied to the DC load and the DC-to-DC converter supplies a remainder of power applied to the DC load.

8. The AC to DC power supply system of claim 1, wherein the passive rectifier comprises passively switched devices configured to operate at current levels exceeding 800 Amps.

9. An AC to DC power supply system comprising:
a three-phase transformer including a grid-connectable primary side with three windings and a secondary side;
an active rectifier coupled to the primary side of the transformer, the active rectifier switchably connecting each of the three windings in series between a positive bus and a negative bus to alter a magnetic flux in a core of the transformer;
a passive rectifier coupled to the secondary side of the transformer to rectify AC power to DC power at an output of the passive rectifier; and
an isolating DC-to-DC converter coupled between the positive bus and the negative bus and the output of the passive rectifier, wherein the DC-to-DC converter is configured to feed power from the active rectifier to the output of the passive rectifier while galvanically isolating the active rectifier from the output of the passive rectifier.

10. The AC to DC power supply system of claim 9, wherein the altered magnetic flux induces non-sinusoidal voltages on the secondary side of the transformer.

11. The AC to DC power supply system of claim 10, wherein rectification of the non-sinusoidal voltages draws sinusoidal current.

12. The AC to DC power supply system of claim 9, further comprising a DC load connected to the output of the passive rectifier and to an output of the DC-to-DC converter, and where in each of the passive rectifier and the DC-to-DC converter supplies a portion of DC power drawn by the DC load.

13. The AC to DC power supply system of claim 12, wherein the passive rectifier supplies a majority of power applied to the DC load and the DC-to-DC converter supplies a minority of power applied to the DC load.

14. The AC to DC power supply system of claim 13, wherein the passive rectifier supplies at least 70% of power applied to the DC load and the DC-to-DC converter supplies a remainder of power applied to the DC load.

15. A method for providing power to a load, the method comprising:
coupling a transformer to a source of sinusoidal AC power and transforming voltage and current of the AC power with the transformer to produce transformed AC power on a secondary side of the transformer;
switchably drawing power, simultaneously with the transforming, from each winding of the transformer to add a non-sinusoidal voltage to each primary winding of a primary side of the transformer, thereby inducing a non-sinusoidal voltage in the transformed AC power in each secondary winding of the secondary side of the transformer;
rectifying the non-sinusoidal voltage in the transformed AC power to produce rectified DC power;
applying the rectified DC power to a DC load; and
feeding the drawn power from each primary winding to the DC load via a galvanically isolated coupling.

16. The method for providing power to a load of claim 15, wherein the rectifying draws a sinusoidal AC current through the transformer.

* * * * *